United States Patent
Ke et al.

(10) Patent No.: US 12,360,415 B2
(45) Date of Patent: Jul. 15, 2025

(54) COLOR FILTER SUBSTRATE, METHOD FOR MANUFACTURING THE SAME, AND DISPLAY PANEL

(71) Applicant: HKC CORPORATION LIMITED, Shenzhen (CN)

(72) Inventors: Shuyu Ke, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/633,493

(22) Filed: Apr. 11, 2024

(65) Prior Publication Data

US 2024/0255795 A1    Aug. 1, 2024

Related U.S. Application Data

(62) Division of application No. 17/908,236, filed on Aug. 31, 2022, now Pat. No. 11,982,895.

(51) Int. Cl.
*G02F 1/1335* (2006.01)

(52) U.S. Cl.
CPC .. *G02F 1/133516* (2013.01); *G02F 1/133512* (2013.01); *G02F 2201/52* (2013.01)

(58) Field of Classification Search
CPC ......... G02F 1/133354; G02F 1/133374; G03F 1/38–42; H01L 2223/5442–54426; H01L 23/544

See application file for complete search history.

(56) References Cited

U.S. PATENT DOCUMENTS

| | | | |
|---|---|---|---|
| 6,734,931 B2 * | 5/2004 | Yu | G02F 1/133514 349/110 |
| 2014/0134770 A1 | 5/2014 | Eom | |
| 2015/0241721 A1 * | 8/2015 | Tanabe | G02B 6/005 349/61 |
| 2016/0306273 A1 | 10/2016 | Nam | |
| 2018/0275458 A1 * | 9/2018 | Lin | G02F 1/1333 |
| 2021/0191551 A1 * | 6/2021 | Kim | G06F 3/0412 |
| 2021/0399254 A1 * | 12/2021 | Ahn | H10K 59/8723 |
| 2023/0122068 A1 * | 4/2023 | Ke | G02F 1/133516 349/106 |

FOREIGN PATENT DOCUMENTS

| | | |
|---|---|---|
| CN | 1873484 A | 12/2006 |
| CN | 103941460 A | 7/2014 |
| CN | 104317158 A | 1/2015 |
| CN | 106842678 A | 6/2017 |

(Continued)

OTHER PUBLICATIONS

Tian, Ran, the ISA written comments, Mar. 2022, CN.
Tian, Ran, the International Search Report, Mar. 2022, CN.

*Primary Examiner* — Jonathan Y Jung

(57) ABSTRACT

A color filter substrate, a manufacturing method thereof, and a display panel are disclosed. The color filter substrate includes a substrate, a black matrix layer, a first filler, and a positioning mark. The black matrix layer is arranged on the substrate, and a groove is defined in the black matrix layer and arranged around a display area of the substrate. The filler is arranged inside the groove. The positioning mark is arranged inside the groove, and has a different color from that of the first filler.

13 Claims, 4 Drawing Sheets

(56) References Cited

FOREIGN PATENT DOCUMENTS

| CN | 107942570 | A | | 4/2018 | |
|----|-----------|---|---|--------|---|
| CN | 207366901 | U | | 5/2018 | |
| CN | 109445172 | A | | 3/2019 | |
| CN | 110703479 | A | | 1/2020 | |
| CN | 112882275 | A | * | 6/2021 | ....... G02F 1/133512 |
| KR | 20120075977 | A | | 7/2012 | |

* cited by examiner

COLOR FILTER SUBSTRATE, METHOD FOR MANUFACTURING THE SAME, AND DISPLAY PANEL

CROSS-REFERENCE TO RELATED APPLICATIONS

This application is a division of U.S. patent application Ser. No. 17/908,236 filed Aug. 31, 2022, which is hereby incorporated by reference herein in its entirety.

TECHNICAL FIELD

This application relates to the field of display technology, and more particularly relates to a color filter substrate, a manufacturing method thereof, and a display panel.

BACKGROUND

The statements herein are intended for the mere purpose of providing background information related to the present application and do not necessarily constitute prior art.

With the development of display technology, people's pursuit of the display quality of display devices is getting increasingly higher. For example, a narrow bezel-ed or even a bezel-less display screen has become one of the highlights of the display screen design. In the manufacturing process of a display device, the array substrate is usually fabricated independently in advance, and then the array substrate and the color filter substrate are aligned and bonded to form a liquid crystal cell. The black matrix on the color filter substrate corresponds to the positions of data lines, scan lines, thin film transistors. etc., on the array substrate, so as to block the data lines, scan lines, thin film transistors, and so on.

In the process of making the color filter substrate, there are several mask exposure processes that require positioning to complete these processes. Currently, typically used for the manufacturing process of the color filter substrate is a positioning mark designed on the black matrix layer of the non-display area on the color filter substrate. However, such a positioning mark disposed on the non-display area will increase the non-display area of the color filter substrate, resulting in a display device having a larger bezel, which affects the aesthetics.

SUMMARY

It is therefore a purpose of the present application to provide a color filter substrate, a manufacturing method thereof, and a display panel, which can reduce the size of the non-display area of the color filter substrate while realizing the positioning process of the color filter substrate to achieve the effect of a narrow bezel.

This application discloses a color filter substrate, including a substrate, a black matrix layer, a first filler and a positioning mark. The substrate includes a display area and a non-display area, and the non-display area is arranged around the display area. The black matrix layer is arranged on the substrate, and is provided with a groove arranged around the display area. The first filler is arranged inside the groove. The positioning mark is arranged inside the groove, and the positioning mark has a different color than that of the first filler. The positioning mark is used for positioning in the manufacturing process of the color filter substrate.

The present application further discloses a method for manufacturing a color filter substrate, including:

forming a black matrix layer in a non-display area on the substrate;
defining a groove in the black matrix layer; and
forming a positioning mark;
wherein a first filler is arranged inside the groove, the positioning mark is arranged inside the groove, the positioning mark has a different color from that of the first filler, and the positioning mark is used for positioning in the manufacturing process of the color filter substrate.

The present application further discloses a display panel, including a color filter substrate, and an array substrate aligned and bonded with the color filter substrate. The color filter substrate includes a substrate, a black matrix layer, a first filler and a positioning mark. The substrate includes a display area and a non-display area, and the non-display area is arranged around the display area. The black matrix layer is arranged on the substrate, and is provided with a groove arranged around the display area. The first filler is arranged inside the groove. The positioning mark is arranged inside the groove, and the positioning mark has a different color than that of the first filler. The positioning mark is used for positioning in the manufacturing process of the color filter substrate.

Compared with the solution of setting the positioning mark on the black matrix layer in the non-display area on the color filter substrate to realize positioning, the present application sets the positioning mark inside the groove in the black matrix layer. That is, the positioning mark is arranged in the groove rather than on the non-display area, and the positioning mark is used in conjunction with the groove, thus realizing the process positioning purpose of the color filter substrate, while reducing the size of the non-display area of the color filter substrate to achieve the effect of a narrow bezel.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
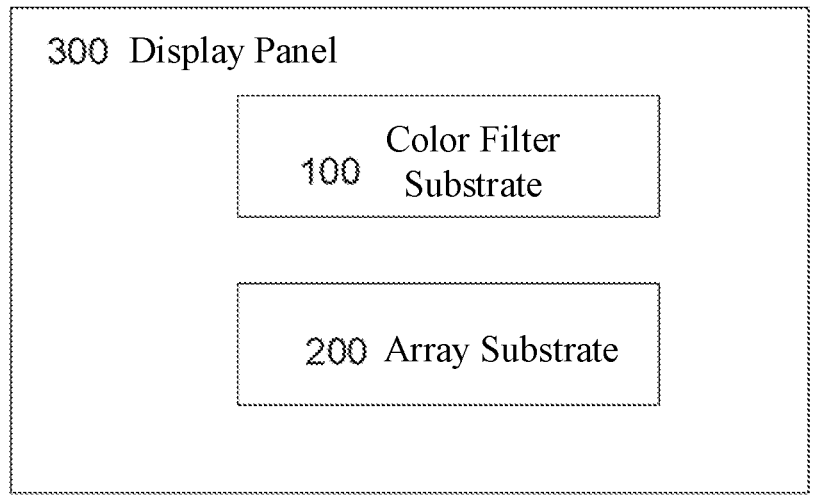
FIG. 1 is a schematic diagram of a display panel according to an embodiment of the present application.

Specific structural and functional details disclosed herein are merely representative and for purposes of describing example embodiments of the present application. The application may, however, be embodied in many alternative forms and should not be construed as limited only to the embodiments set forth herein.

In the description of this application, it should be understood that the orientations or positional relationships indicated by terms such as "center", "transverse", "lateral", "above", "on", "under", "below", "left", "right", "vertical", "horizontal", "top", "bottom", "inside", "outside", etc., are based on the orientations or relative positional relationships illustrated in the drawings, and are intended for the mere purpose of convenience of simplified description of the present application, rather than indicating or implying that the device or element referred to must have a specific orientation or be constructed, and operate in a particular orientation. Thus, these terms should not be construed as limiting the present application. In addition, the terms "first" and "second" are merely used for description purposes, and cannot be understood as indicating or implying relative importance, or implicitly indicating the number of indicated technical features. Thus, features defined as "first" and "second" may expressly or implicitly include one or more of the features. In the description of this application, unless stated otherwise, "plurality" means two or more. Additionally, terms "including", "comprising", and any variations thereof are intended to encompass a non-exclusive inclusion.

In the description of this application, it should be noted that, unless otherwise expressly specified and defined, terms "installed on", "connected to", and "coupled to" should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The terminology used herein is for the purpose of describing specific embodiments only and is not intended to limit the exemplary embodiments. The terminology used herein is for the purpose of describing specific embodiments only and is not intended to limit the exemplary embodiments. As used herein, the singular forms "a" and "an" are intended to include the plural unless the context clearly dictates otherwise. It should also be understood that the terms "including" and/or "comprising" as used herein specify the presence of stated features, integers, steps, operations, units and/or components, but do not preclude the presence or addition of one or more other features, integers, steps, operations, units, components and/or combinations thereof.

The present application will be further described below with reference to the accompanying drawings and embodiments.

Figure 2:
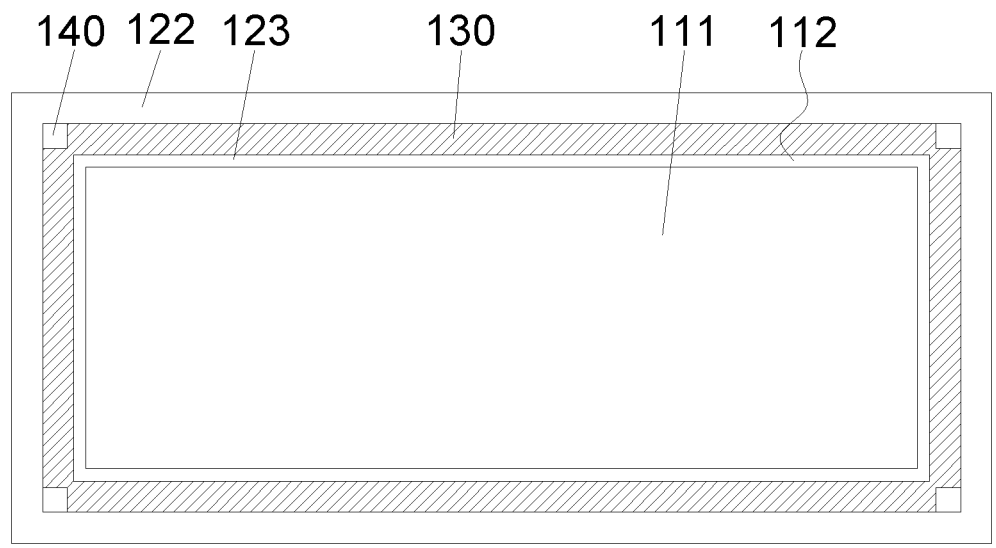
FIG. 2 is a schematic diagram of a color filter substrate according to an embodiment of the present application.

As illustrated in FIG. 1, in one embodiment, a display panel 300 is disclosed. The display panel 300 includes a color filter substrate 100 and an array substrate 200, which are aligned and bonded together to form a liquid crystal panel cell. As illustrated in FIG. 2, the color filter substrate includes a substrate 110, a black matrix layer 120, a first filler 130, and a positioning mark 140. The substrate 110 includes a display area 111 and a non-display area 112, where the non-display area 112 is arranged around the display area 111. The black matrix layer 120 is disposed in the non-display area 112 of the substrate 110. The black matrix layer 120 is provided with a groove, which is an annular groove. In particular, grooving is performed on the four sides of the black matrix layer 120 corresponding to the boundary between the display area and the non-display area to form an annular groove, which is arranged around the display area 111 and separates the black matrix layer 120 into a first black matrix layer 122 along the groove away from the display area 111 and a second black matrix layer 123 along the groove close to the display area 111.

The first filler 130 is disposed inside the groove to prevent external static electricity from being introduced into the display area 111. The positioning mark 140 is arranged inside the groove, and has a different color from that of the first filler. The positioning mark 140 is used for positioning in the manufacturing process of the color filter substrate. The positioning mark 140 is arranged inside the groove, which is beneficial to reduce the occupation of other areas of the bezel, thereby reducing the width of the bezel and realizing the effect of a narrow bezel. The positioning mark 140 is used to realize the function of the positioning mark. While realizing the positioning in the manufacturing process of the color filter substrate, the size of the non-display area 112 of the color filter substrate is reduced. Compared with the typical black matrix layer in which the positioning mark is placed on the non-display area 112, the bezel is narrowed.

In this embodiment, the first filler 130 is a blue color filter. The shielding rate of a blue color filter is higher than that of a red color filter and a green color filter, and so has a good shielding effect. The positioning mark 140 may be a red color filter. Apart from creating a pattern difference from the first filler 130, the positioning mark 140 may also exhibit characteristics of color difference, so that the CCD camera could have a higher recognition precision.

Further, the groove may be a blind groove or a through groove. When the groove is a blind groove, the black matrix layer 120 at the bottom of the groove is thin and has a large resistance, which prevents the external static electricity from being transmitted to the display area 111 through the black matrix layer 120 when the black matrix layer 120 contacts the outside environment, thus serving the function of preventing static electricity. When the groove is a through groove, the first black matrix layer 122 and the second black matrix layer 123 are completely isolated from each other, thus preventing external static electricity from being transmitted into the display area 111, thus achieving an anti-static-electricity effect. The manufacturer can choose the specific groove shape to be a blind groove or a through groove depending on the process requirements, which however will not be detailed herein.

Apart from being arranged inside the groove, the positioning mark may also be arranged on the first black matrix layer, namely the positioning marks can be arranged in both places for combined use so that the CCD camera can have a high capture and recognition precision. Furthermore, when the positioning mark 140 is separately arranged on the first black matrix layer 121, the situation can be avoided where the recognition of the positioning mark 140 is affected due to the shape of the positioning unit 130 when the positioning mark 140 is arranged on the positioning unit 130. Individually recognizing the positioning mark 140 can provide a high precision, and the CCD camera is not affected when capturing an image.

As illustrated in FIG. 2, the positioning mark 140 is a rectangle. The positioning mark is made of a red color filter, and the first filler is a blue color filter. The rectangular shape is convenient for the CCD camera to capture, recognize, and locate, and also makes it easier to form the positioning mark 140. The red color filter has better light shielding capability than other colors and is easier to identify. The length dimension of the positioning mark 140 is in the range of 20-100 micrometers, the width dimension is in the range of 20-100 micrometers, namely the size range is set between 20-100 micrometers. If the length dimension or width dimension is less than 20 microns, the positioning mark 140 would have a small size, and so the recognition speed would be slow. Furthermore, in terms of the existing manufacturing process, the process with the length dimension or width dimension less than 20 microns cannot be realized. If the length dimension or width dimension is larger than 100 microns, the size of the positioning mark 140 is larger, and because the positioning mark 140 is arranged inside the groove, there will be a risk of light leakage. The color of the positioning mark 140 is different from the color of the first filler 130, so that the CCD camera can capture not only by shape, but also by color, which further improves the recognition accuracy of the positioning mark 140 and the recognition speed of the CCD camera.

Figure 3:
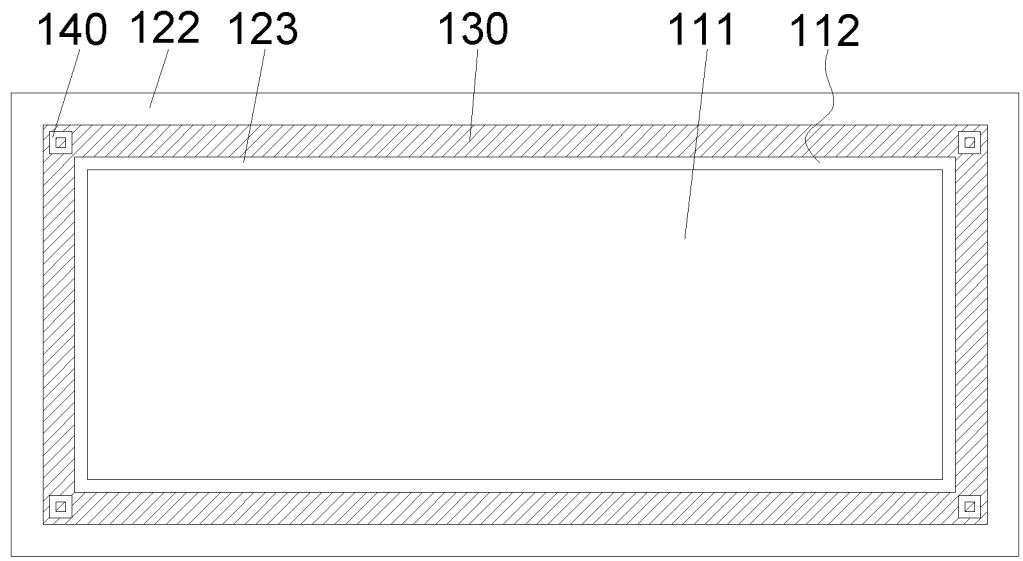
FIG. 3 is a schematic diagram of a color filter substrate according to another embodiment of the present application.

As illustrated in FIG. 3, in one embodiment, the positioning mark 140 is in the shape of an annular square (the shape of a Chinese character "回"). The center of the positioning mark 140 is filled with a second filler. The second filler and the first filler can be formed at the same time. The first filler and the second filler may have the same blue color or other color, or they may have different colors, but both have different colors from that of the positioning mark. By designing the positioning mark 140 as an annular square shape, it is more convenient for the CCD camera to capture, recognize and locate. In addition, the center of the positioning mark 140 is filled with the first filler, and the color of the positioning mark 140 is different from that of the first filler 130, so that the CCD camera can capture not only by the shape of the annular square, but also by color, thus further improving the recognition precision of the positioning mark 140 and the recognition speed of the CCD camera. Apart from the rectangular shape and the annular square shape, the positioning mark 140 can also use a cross shape or other special microstructures capable of easy recognition, such as triangles, circles, etc., to improve the recognition precision of the CCD camera. In particular, in this embodiment, the positioning mark 140 is a red color filter, the first filler 130 is a blue color filter, and the red color filter is arranged surrounding the blue color filter. The CCD camera can not only identify the annular square pattern of the positioning mark 140, but also can identify the colors of the positioning mark 140 and the first filler 130, or use pattern recognition and color recognition in combination to improve the recognition accuracy while improving the recognition speed. The contact interfaces made between the positioning mark 140, the first filler 130, and the groove with the sealant are preferably designed as non-planar microstructures, thereby enhancing the bonding area and strength of the sealant. Further, under the premise of not affecting the thickness of the box, the first filler 130 and the groove are designed in the form of different heights, thereby further enhancing the bonding area and strength of the sealant. In addition, the positions of the first black matrix layer 122, the second black matrix layer 123 and the groove are set corresponding to the position of the sealant. The widths of the first black matrix layer 122, the second black matrix layer 123 and the groove are smaller than the width of the sealant, thereby enhancing the bonding area of the sealant, so that the sealant surrounds the first black matrix layer 122, the second black matrix layer 123 and the groove 122, thereby enhancing the adhesion strength of the sealant.

Figure 7:
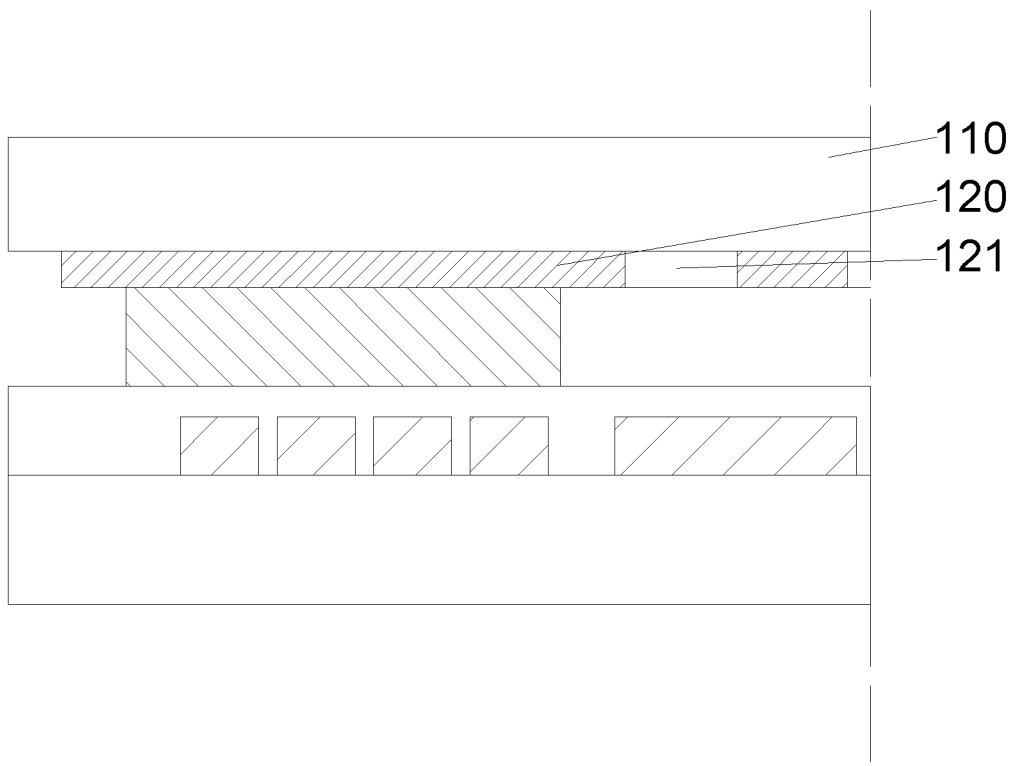
FIG. 7 is a partial cross-sectional schematic diagram of a display panel according to another embodiment of the present application.

Further, the solution in which the positioning mark is a red color filter and the first filler is a blue color filter is preferably applied to the case illustrated in FIG. 7. In the figure, because the metal traces in the display area are relatively wider, the light irradiated from the bottom of the substrate 110 can be blocked, so that the light transmittance through the groove 121 area is weak. Using the solution where the positioning mark is a red color filter and the first filler is a blue color filter not only improves the accuracy of the CCD camera in recognizing the positioning mark, but also uses positioning marks with different colors depending the actual situation to improve recognition accuracy of the CCD camera while filling the red color filter in an area where the light transmission is weak. Compared with the solution in which the positioning mark is a blue color filter and the first filler is a red color filter, the color filter substrate thus arranged has a better light shielding effect.

Of course, the colors of the positioning mark and the first filler disposed in the middle of the positioning mark are not limited to only the above option, and there are in fact six color setting schemes for the positioning mark and the first filler. For example, the first filler is a blue color filter, and the positioning mark is a red color filter; or the first filler is a blue color filter, and the positioning mark is a green color filter; or the first filler is a red color filter, the positioning mark is a blue color filter; or the first filler is a red color filter, and the positioning mark is a green color filter; or the first filler is a green color filter, the positioning marking is blue color filler; or the first filler is green color filter, the positioning mark is red color filter; and so on and so forth, a variety of color setting schemes are possible, which can be selected depending on the actual production process.

Figure 4:
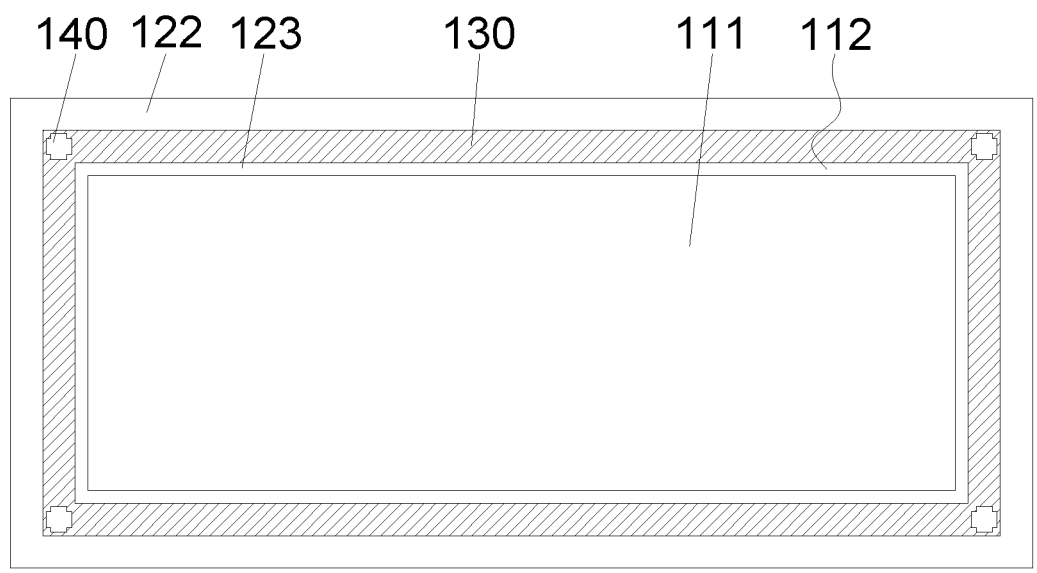
FIG. 4 is a schematic diagram of a color filter substrate according to yet another embodiment of the present application.

As illustrated in FIG. 4, there are four positioning marks 140, the shape of the groove is a rectangle, and the positioning marks 140 are respectively located at the four corners inside the groove. Specifically, the four positioning marks 140 are respectively arranged at the four top corners inside the groove. After the CCD camera captures the positioning marks 140, then according to the four positioning marks 140, the rectangle formed by the connecting lines connecting the four positioning marks 140 is similar in size to the color filter substrate, which improves the recognition accuracy. Nevertheless, the four positioning marks 140 don't necessarily need to be arranged at the four corners inside the groove, and they may also be arranged along both sides of the inside of the groove. However, if the positioning marks 140 are arranged in this way, the closer the position of the positioning marks 140 is to the center of the color filter substrate, the lower the recognition accuracy of the CCD camera, which may cause errors in the position of the color filter substrate during the manufacturing process, thereby affecting the display effect.

Figure 5:
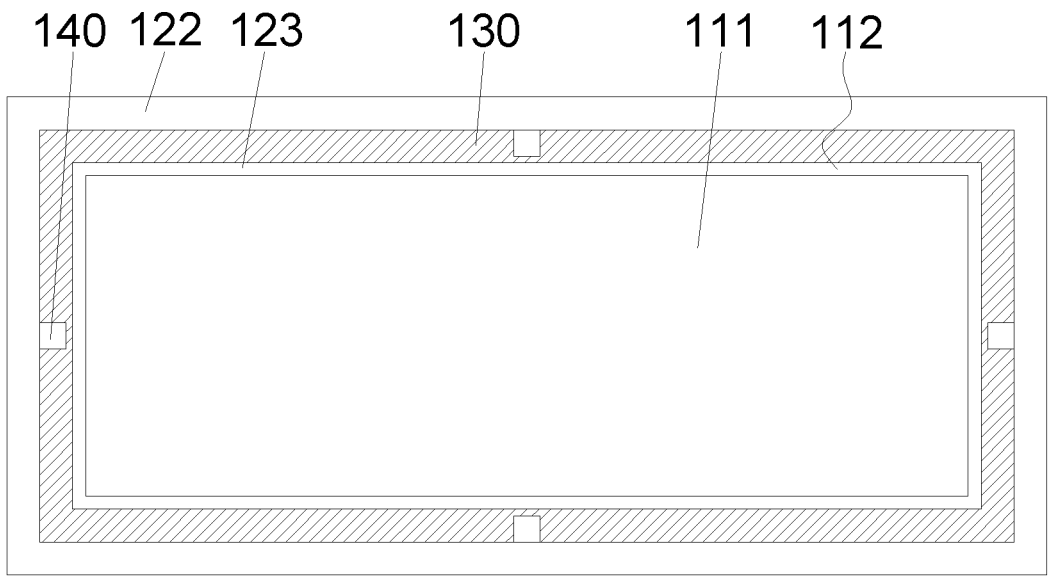
FIG. 5 is a schematic diagram of a color filter substrate according to yet another embodiment of the present application.

As illustrated in FIG. 5, there are four positioning marks 140, the shape of the groove is an annular square shape, and the positioning marks 140 are respectively located in the middles of the four sides of the groove. Specifically, four positioning marks 140 are respectively arranged in the middles of the four sides of the groove. That is, a cross made up of two center lines is set in the center of the color filter substrate and extends to the groove, and the four positioning marks 140 are respectively located at the intersections of the cross of center lines with the groove. This arrangement avoids wrinkles in the center of the screen that may be present when the positioning marks 140 are set at the four corners during the bonding process of a large size screen. Such arrangement of the positions of the positioning marks 140 is suitable for the bonding process of a large-size screen.

Further, the four sides of the groove include an outer side and an inner side, the outer side is the side of the groove away from the display area, and the inner side is the side of the groove adjacent to the display area. In this embodiment, the positioning mark has three position modes. For example, the positioning mark may be disposed in the middle of each of the four sides of the groove, and one side of the positioning mark is arranged in close contact with the outer side of the groove. For example, the positioning mark may be disposed in the middle of each of the four sides of the groove, and one side of the positioning mark is arranged in close contact with the inner side of the groove. For another example, the positioning mark may be disposed in the middle of each of the four sides of the groove, and the positioning mark is arranged in the middle of the outer side and the inner side of the groove.

The four positioning marks can be set in different shapes to further improve the recognition accuracy. Specifically, the shapes of the positioning marks can be selected from a variety of easily identifiable microstructure shapes such as a rectangle, a triangle, a circle, a pentagon, a star, etc., which have clear differences with respect to the shape lines of the groove. There are many kinds of the order in which the four positioning marks are arranged; here, the positioning mark structures include a rectangle and a triangle to illustrate the arrangement order, but the positioning marks will not be limited to the rectangle and the triangle. For example, rectangles are set on the left and right sides of the upper end of the groove, and triangles are set on the left and right sides of the lower end of the groove. For example, triangles are set on the left and right sides of the upper end of the groove, and rectangles are set on the left and right sides of the lower end of the groove. For example, a rectangle is set on the left side of the upper end of the groove, a triangle is set on the right side of the upper end of the groove, a rectangle is set on the left side of the lower end of the groove, and a triangle is set on the right side of the lower end of the groove. For example, a triangle is set on the left side of the upper end of the groove, a rectangle is set on the right side of the upper end of the groove, a triangle is set on the left side of the lower end of the groove, and a rectangle is set on the right side of the lower end of the groove. For example, a triangle is set on the left side of the upper end of the groove, a rectangle is set on the right side of the upper end of the groove, a rectangle is set on the left side of the lower end of the groove, and a triangle is set on the right side of the lower end of the groove. For another example, a rectangle is set on the left side of the upper end of the groove, a triangle is set on the right side of the upper end of the groove, a triangle is set on the left side of the lower end of the groove, and a rectangle is set on the right side of the lower end of the groove. There are various arrangements, and the arrangement and shapes of the positioning marks can be selected depending on the actual manufacturing process.

Figure 6:
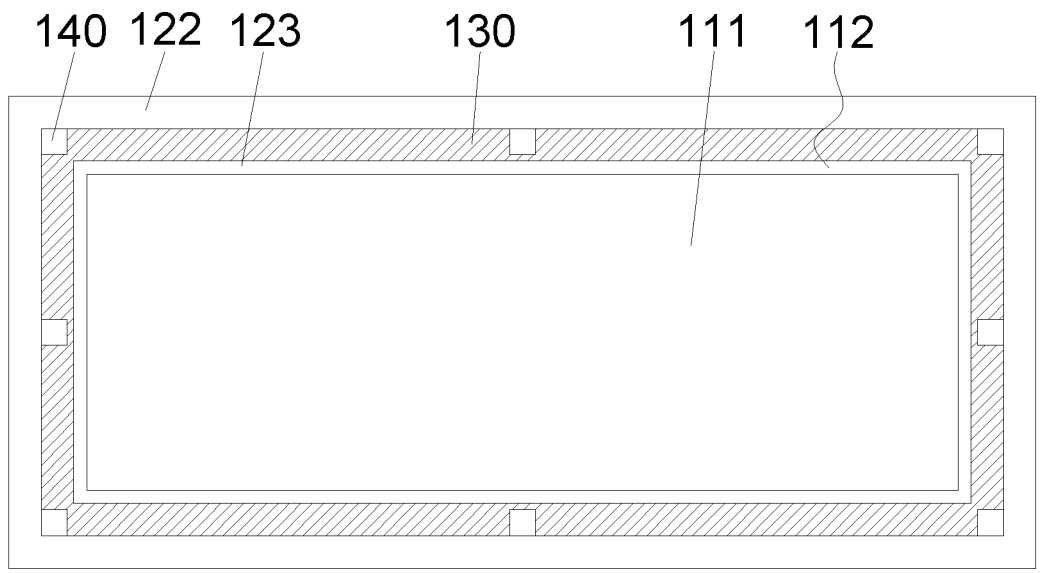
FIG. 6 is a schematic diagram of a color filter substrate according to still another embodiment of the present application.

As illustrated in FIG. 6, there are eight positioning marks 140, the shape of the groove is a rectangle, four positioning marks 140 are respectively set at the four corners of the groove, and the other four positioning marks 140 are respectively set in the middles of the four sides of the groove. That is, four positioning marks 140 are respectively arranged at the four corners inside the groove, while the other four positioning marks 140 are respectively arranged at the middles of the four sides of the groove, and so the connection lines of the eight positioning marks 140 can form a Union-Jack shape. In this way, in the process of bonding the screen, because there are four positioning marks 140 arranged at the four corners inside the groove, the recognition accuracy is improved, and the other four positioning marks 140 are additionally respectively arranged in the middles of the four sides of the groove, so as to avoid wrinkles in the center of the screen during the process of screen bonding. The positions of the positioning marks 140 are not only suitable for large-sized screens, but also for small-sized screens, which improves the recognition accuracy and reduces the risk of damage, and avoids wrinkles in the center of the screen due to inaccurate positioning accuracy during the screen bonding process.

The first filler is a material with light shielding function and non-conductive. In this embodiment, possible materials of the first filler include alumina ceramic, calcium oxide ceramic or opaque silicon oxide, which are capable of high temperature resistance, electric insulation, and light-shielding effect; they can be filled in the groove and act as a color filter.

In the above embodiment, the positioning mark 140 is made of a metal material, and a gate metal layer or a data line metal layer can be selected to increase the service life of the positioning mark 140. The positioning mark 140 can be formed by exposure and development with a mask, and so is convenient to manufacture. By setting the positioning unit 130 and the positioning mark 140, the positioning unit 130 is used in combination with the positioning mark 140. After the CCD camera captures the positioning unit 130, it first performs a rough positioning, and then captures the positioning mark 140 set on the positioning unit 130, namely the whole capturing process is divided into two-times recognition process, which improves the recognition accuracy and also improves the recognition speed. Moreover, the manufacturing specification of the positioning mark 140 can be improved, so that the positioning mark can be quickly identified even when the positioning mark of a small size is used, and the size of the non-display area 112 on the color filter substrate 100 is also reduced to achieve the effect of a narrow bezel.

Figure 8:
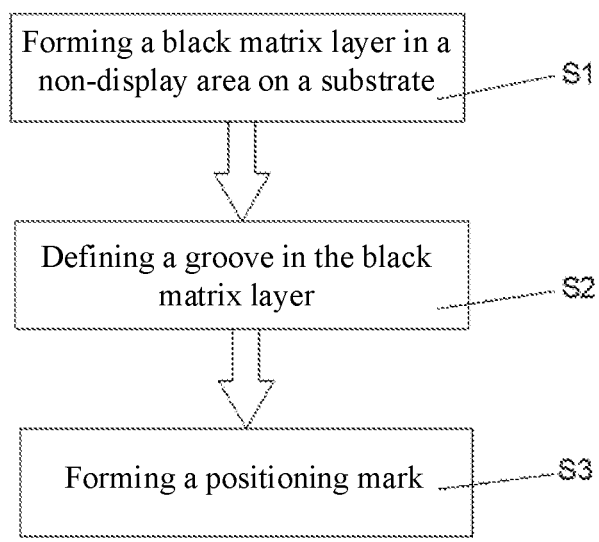
FIG. 8 is a schematic flowchart of a method for fabricating a color filter substrate according to another embodiment of the present application.

As illustrated in FIG. 8, in one embodiment, a method for manufacturing a color filter substrate is disclosed, including the following operations:
- S1: forming a black matrix layer 120 in a non-display area on the substrate 110;
- S2: defining a groove in the black matrix layer 120 using a photomask; and
- S3: forming a positioning mark;
- wherein the positioning mark is arranged inside the groove, and is used for positioning in the manufacturing process of the color filter substrate; for example, the positioning mark is used as a positioning unit for positioning with an array substrate.

The black matrix layer 120 is coated on the substrate 110 by a coating process, and then a groove can be made in the black matrix layer 120 by using a general mask developing technology to divide the black matrix layer 120 into a first black matrix layer and a second black matrix layer. Positioning marks can be formed by photomask development technology. Compared with a typical color filter substrate, the color filter substrate made by the above method reduces the size of the non-display area of the color filter substrate and realizes the effect of a narrow bezel.

The black matrix layer 120 is coated on the substrate 110 by a coating process, and then a groove can be made in the black matrix layer 120 by using a general mask developing technology to divide the black matrix layer 120 into a second black matrix layer and a first black matrix layer. In particular, the HTM process is used to control the exposure amounts in different areas to form the sidewall of the groove into a stepped shape, and then a positioning unit is formed by a mask developing technology. After the positioning unit is formed, a positioning mark is formed on the positioning unit. Compared with a typical color filter substrate, the color filter substrate of the present application reduces the size of the non-display area of the color filter substrate and realizes the effect of a narrow bezel.

The panel discussed in this application may be a TN panel (Twisted Nematic), an IPS panel (In-Plane Switching), or a VA panel (Multi-domain Vertica Alignment). Of course, other types of panels, as applicable, may also be used.

The foregoing is a further detailed description of the present application in conjunction with specific typical embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A color filter substrate, comprising:
   a substrate, comprising a display area and a non-display area, the non-display area surrounding the display area;
   a black matrix layer, arranged on the substrate, wherein a groove is defined in the black matrix layer and is arranged around the display area;
   a first filler, disposed inside the groove; and
   a positioning mark, arranged inside the groove and having a different color than that of the first filler, and configured for a positioning purpose in a manufacturing process of the color filter substrate;
   wherein the positioning mark is a red color filter, the first filler is a green color filter, and wherein the green color filter is arranged around the red color filter.

2. The color filter substrate as recited in claim 1, wherein the positioning mark comprises a rectangle, and has a length dimension of 20-100 microns and a width dimension of 20-100 microns.

3. The color filter substrate as recited in claim 1, wherein the positioning mark is in the shape of an annular square, and a second filler is disposed in a center of the positioning mark and surrounded by the positioning mark, and wherein the second filler has a different color than that of the positioning mark.

4. The color filter substrate as recited in claim 3, wherein the second filler has a same color as the first filler, and the second filler and the first filler are formed simultaneously.

5. The color filter substrate as recited in claim 1, wherein there are arranged four positioning marks, the groove has a shape of a rectangle, and wherein the four positioning marks are respectively disposed at four corners inside the groove.

6. The color filter substrate as recited in claim 5, wherein two sides of each of the four positioning marks respectively coincide with two sides of the groove.

7. The color filter substrate as recited in claim 1, wherein there are arranged four positioning marks, the groove has a shape of a rectangle, and wherein the four positioning marks are respectively disposed in four middle positions of four sides of the groove.

8. The color filter substrate as recited in claim 1, wherein the positioning mark is a cross-shaped structure.

9. The color filter substrate as recited in claim 1, wherein there are arranged eight positioning marks, the groove has a shape of a rectangle, and wherein the eight positioning marks are respectively disposed at four corners inside the groove and at four middle positions of four sides of the groove.

10. The color filter substrate as recited in claim 1, wherein contact interfaces made by the positioning mark, the first filler, and the groove with a sealant are non-planar microstructures, and wherein the first filler and the groove are arranged to have different heights.

11. The color filter substrate as recited in claim 1, wherein the groove is a blind groove.

12. The color filter substrate as recited in claim 1, wherein the first filler is made of aluminum oxide ceramic, calcium oxide ceramic, or opaque silicon oxide, and wherein the positioning mark is of a metal material.

13. A color filter substrate, comprising:
   a substrate, comprising a display area and a non-display area, the non-display area surrounding the display area;
   a black matrix layer, arranged on the substrate, wherein a groove is defined in the black matrix layer and is arranged around the display area;
   a first filler, disposed inside the groove; and
   a positioning mark, arranged inside the groove and having a different color than that of the first filler, and configured for a positioning purpose in a manufacturing process of the color filter substrate;
   wherein the first filler is made of aluminum oxide ceramic, calcium oxide ceramic, or opaque silicon oxide, and wherein the positioning mark is of a metal material.

* * * * *